(12) United States Patent
Brenner et al.

(10) Patent No.: US 11,961,112 B2
(45) Date of Patent: Apr. 16, 2024

(54) MANAGING IMPRESSIONS OF AN ADVERTISEMENT CAMPAIGN

(71) Applicant: Rovi Guides, Inc., San Jose, CA (US)

(72) Inventors: Joshua Brenner, New York, NY (US); Christopher Ambrozic, Chapel Hill, NC (US)

(73) Assignee: Rovi Guides, Inc., San Jose, CA (US)

( * ) Notice: Subject to any disclaimer, the term of this patent is extended or adjusted under 35 U.S.C. 154(b) by 0 days.

(21) Appl. No.: 18/229,020

(22) Filed: Aug. 1, 2023

(65) Prior Publication Data

US 2023/0385870 A1    Nov. 30, 2023

Related U.S. Application Data

(63) Continuation of application No. 17/253,044, filed as application No. PCT/US2018/064950 on Dec. 11, 2018, now Pat. No. 11,756,071.

(60) Provisional application No. 62/728,040, filed on Sep. 6, 2018.

(51) Int. Cl.
*G06Q 30/00* (2023.01)
*G06Q 30/0241* (2023.01)
*G06Q 30/0242* (2023.01)

(52) U.S. Cl.
CPC ..... *G06Q 30/0243* (2013.01); *G06Q 30/0244* (2013.01); *G06Q 30/0246* (2013.01); *G06Q 30/0249* (2013.01)

(58) Field of Classification Search
None
See application file for complete search history.

(56) References Cited

U.S. PATENT DOCUMENTS

| | | |
|---|---|---|
| 7,761,892 B2 | 7/2010 | Ellis et al. |
| 11,049,133 B1 | 6/2021 | Huang et al. |
| 2003/0171990 A1 | 9/2003 | Rao et al. |
| 2006/0265286 A1 | 11/2006 | Evangelist et al. |
| 2006/0282533 A1 | 12/2006 | Steelberg et al. |
| 2009/0006145 A1 | 1/2009 | Duggal et al. |
| 2010/0262499 A1 | 10/2010 | Karlsson et al. |
| 2011/0125573 A1 | 5/2011 | Yonezaki et al. |
| 2012/0253922 A1 | 10/2012 | Baluja |
| 2013/0066725 A1 | 3/2013 | Umeda |
| 2013/0268347 A1 | 10/2013 | Bala et al. |
| 2015/0199731 A1 | 7/2015 | Jevtic et al. |
| 2015/0227963 A1 | 8/2015 | Geyik et al. |
| 2015/0332192 A1 | 11/2015 | Harel |
| 2016/0267527 A1 | 9/2016 | Flood et al. |
| 2016/0379243 A1 | 12/2016 | Kalish et al. |
| 2016/0379244 A1 | 12/2016 | Kalish et al. |

(Continued)

OTHER PUBLICATIONS

International Search Report and Written Opinion in PCT/US2018/064923 dated Mar. 19, 2019.

(Continued)

*Primary Examiner* — Alvin L Brown
(74) *Attorney, Agent, or Firm* — Haley Guiliano LLP

(57) ABSTRACT

The present disclosure provides for management of impressions in advertisement campaigns. Impressions may be moved between different impression media based on performance metrics and historical data. Impression budgets may be modified in an active campaign based on forecasts determined using current performance data. Impression budgets may be reallocated between simultaneously active advertisement campaigns.

18 Claims, 9 Drawing Sheets

(56) References Cited

U.S. PATENT DOCUMENTS

2021/0264465 A1  8/2021  Brenner et al.
2021/0272152 A1  9/2021  Brenner et al.
2021/0272154 A1  9/2021  Brenner et al.

OTHER PUBLICATIONS

International Search Report and Written Opinion in PCT/US2018/064926 dated Mar. 19, 2019.
International Search Report and Written Opinion in PCT/US2018/064950 dated Mar. 19, 2019.

300

302 — Impression:

304 — Current Medium: Ad Before Video A

306 — Alternate Medium: Ad Before Video B

308 — Likelihood of Access in Video B
>
Likelihood of Access in Video A

310 — Transfer Impression

MANAGING IMPRESSIONS OF AN ADVERTISEMENT CAMPAIGN

CROSS-REFERENCE TO RELATED APPLICATIONS

This patent application a continuation of U.S. patent application Ser. No. 17/253,044, filed Dec. 16, 2020, which is a national stage application under 37 U.S.C. § 371 of International Application PCT/US2018/064950, filed Dec. 11, 2018, which claims priority to U.S. Provisional Application No. 62/728,040, filed on Sep. 6, 2018, which are hereby incorporated by reference herein in their entireties.

The present disclosure is directed towards systems and methods for management of the presentation of impressions in an advertisement campaign.

BACKGROUND

In an advertisement campaign, an advertiser uses impressions to provide consumers with exposure to a product or service. An impression is the display, audio output, or any other suitable presentation of an advertisement or other piece of content in connection with a marketing effort on a device. For example, Marvel Studios may be interested in informing users about an upcoming movie (e.g., Avengers Infinity War) through a 2-week advertisement campaign with advertisements featuring digital posters, pop-up display elements, user interface advertisements, interactive advertisements, t-commerce advertisements, trailer placements, etc. Ideally a user will view an impression, which will influence his/her decision to buy/consume the product (e.g., go to the movie theater to watch Avengers Infinity War).

SUMMARY

The present disclosure provides a method for managing impressions, comprising determining, using processing circuitry, that a content provider launched at least two advertisement campaigns, each campaign associated with a respective subject being advertised and each campaign allocated a respective number of budgeted impressions. The method further comprises calculating for each advertisement campaign of the at least two advertisement campaigns, a respective rate of impression generation. The method further comprises determining, using the processing circuitry, a redistribution of allocations of each of the respective number of budgeted impressions amongst the at least two advertisement campaigns based on each of the respective rates of impression generation. The method further comprises implementing the redistribution amongst the at least two advertisement campaigns.

The present disclosure provides a system for managing impressions, comprising processing circuitry. The processing circuitry is configured for determining that a content provider launched at least two advertisement campaigns, each campaign associated with a respective subject being advertised and each campaign allocated a respective number of budgeted impressions. The processing circuitry is further configured for calculating for each advertisement campaign of the at least two advertisement campaigns a respective rate of impression generation. The processing circuitry is further configured for determining a redistribution of allocations of each of the respective number of budgeted impressions amongst the at least two advertisement campaigns based on each of the respective rates of impression generation. The processing circuitry is further configured for implementing the redistribution amongst the at least two advertisement campaigns.

The present disclosure provides a non-transitory computer-readable medium having instructions programmed thereon for managing impressions by performing the method comprising determining that a content provider launched at least two advertisement campaigns, each campaign associated with a respective subject being advertised and each campaign allocated a respective number of budgeted impressions. The method further comprises calculating for each advertisement campaign of the at least two advertisement campaigns a respective rate of impression generation. The method further comprises determining a redistribution of allocations of each of the respective number of budgeted impressions amongst the at least two advertisement campaigns based on each of the respective rates of impression generation. The method further comprises implementing the redistribution amongst the at least two advertisement campaigns.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which.

DETAILED DESCRIPTION

Figure 1:
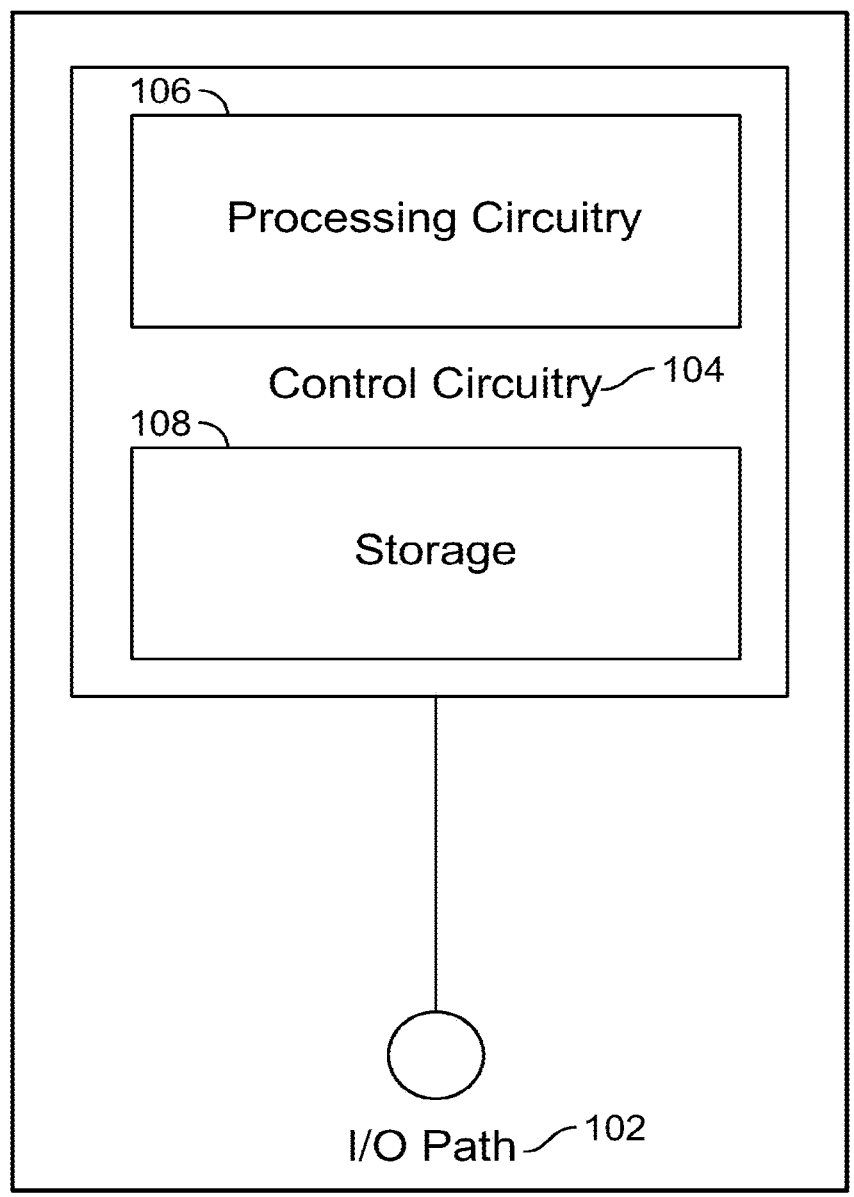
FIG. 1 is a block diagram of an illustrative user equipment device in accordance with some embodiments of the disclosure.

Targeted advertisements optimize the placement of advertising for impressions. An impression is defined as advertising or other marketing-related content that has been generated, shown, or otherwise presented to a consumer. For example, if a user is viewing an action movie on YouTube, an advertisement for Avengers Infinity War (e.g., a small digital banner) may be overlaid on the screen during playback, counting as 1 impression. However, because impressions are costly, advertisers need better methods to determine how to budget impressions during an advertisement campaign. For example, the advertiser may place 100 impressions (e.g., in the form of digital banners advertising the movie) in a mobile application. If only 40 people view the advertisement by accessing the mobile application during the 2-week advertisement campaign (yielding 40 impressions), 60 impressions are lost. Similarly, if 200 people access the mobile application during the 2-week advertisement campaign, 100 people are left unexposed to the advertisement because the impression has already been generated to the first 100 people. These problems ultimately lead to ineffective advertisement campaigns that either cost too much or never reach their potential.

The following system budgets impressions of an advertisement campaign. The system also redistributes existing impressions in real time and determines how impressions can be shared and whether an advertisement campaign should be ended in view of the progress made by the advertisement campaign.

It should be noted that the systems, methods, apparatuses, and/or aspects described above may be applied to, or used in accordance with, other systems, methods, apparatuses, and/or aspects described in this disclosure.

An "impression budget" is, for example, a particular number of impressions allocated to a particular advertisement campaign. An "advertisement campaign" is, for example, a delivery of an impression budget across one or more media. The delivery comes in the form of providing impressions, e.g., generating an impression on a page, based on any suitable trigger to any suitable consumer/user, including, for example, according to a schedule, preferences, demographics, any other suitable trigger, or any combination thereof. An advertisement campaign is considered active while a non-zero budget exists and impressions are being provided on respective impression media. A "medium" or "impression medium" (or "media" for plural) is, for example, the form and/or platform in which the advertisement is provided to a user. For example, a medium may be a banner advertisement in a mobile application, a television commercial, a radio announcement, an image on a display screen in a store, a video on a YouTube channel or video, or any other suitable form or platform. A medium may be further defined by schedule, placement, size, or any other suitable characteristic of how an impression is presented. An impression is generated when, for example, an impression is provided in a medium for viewing, listening, or otherwise gaining the attention of a user/consumer.

In some embodiments, the following system automatically budgets impressions of an upcoming advertisement campaign. Specifically, the system may generate projections of generation based on (1) previous generation of impressions and (2) anticipation of how the new impressions will be generated.

Continuing the overarching example, the system may retrieve previous impression budgets from Marvel Studios. For example, Marvel Studios may have pursued advertisement campaigns for movies such as "Captain America Civil War" and "Ironman 3." The system may determine whether the impression allocation for those movies was overbudget or underbudget. If the movies were underbudget, the system identifies popular media (e.g., mobile applications, radio, etc.) where all impressions were generated before the originally scheduled termination of the respective advertisement campaign. The system will mark these media as areas where impressions should be allocated. If the movies were over budget, the system identifies the impression media where the impressions were underutilized and mark those media as avoidable.

In terms of anticipation, the system will identify future events that may cause different results from previous impression generation. For example, a newly released mobile application (e.g., Pokemon Go) may be experiencing a sudden spike in popularity. Therefore, placing more impressions in that mobile application may be beneficial to the advertisement campaign despite, for example, past overbudgeting of impressions in mobile applications. In another example, a previously popular mobile application that was under-budgeted in a past advertisement campaign may no longer be as popular. Accordingly, the system will lower the number of impressions for that mobile application despite the past under-budgeting.

Ultimately, given the time period of the advertisement and the amount of money an advertiser is willing to spend on impressions for the advertisement campaign, the system will determine the best way to distribute the impressions across various media.

Furthermore, because impressions are costly, the system provides advertisers with the ability to determine where to place impressions and to adjust advertisement campaigns in real-time. For example, allocating 100 impressions for a YouTube video that is similar to the Avengers Infinity War may not be effective if the YouTube video gets only 20 views. This would ultimately waste 80 impressions.

To address this, the system of the present disclosure intelligently distributes impressions during an advertisement campaign to optimize the viewer exposure range. Specifically, the system may identify content that a specific number of impressions are allocated for. Suppose that the content is a YouTube video "Jimmy Kimmel interviews Avengers cast member Robert Downey Jr." Due to the relevance to Avengers Infinity War, the advertiser may have allocated 100 impressions (e.g., 100 appearances of the Avengers Infinity War digital banner overlaid on the video). The system will determine how many of the impressions are being generation in the video. Simultaneously, the system will monitor other videos where impressions can be transferred (given that the other video has a higher likelihood of being watched). For example, the system determines that another YouTube video has gone viral by, for example, detecting a spike in views in a short span of time. The system will determine the number of impressions to transfer to the viral YouTube video from "Jimmy Kimmel interviews Avengers cast member Robert Downey Jr" based on, for example, a likelihood ratio (e.g., likelihood of the viral YouTube video being watched over likelihood of the original video being watched).

The system may use additional factors to determine whether to redistribute impressions in an advertisement campaign. For example, impressions may be transferred away if the current medium (e.g., video, game, application, website, etc.) is failing to attract viewers to which the impression will be generated. Likewise, additional impressions may be added to the current medium if the current medium is attracting viewers to which the impression will be generated. If the impressions are in broadcasts (e.g., commercials in television shows), the impressions may be moved according to a schedule based on when users turn on their devices to view the broadcasts. If the impressions are placed in a physical location (e.g., a television in a shopping center), the impression may be transferred away if, for example, there is less than an expected attendance on a specific day.

In certain scenarios, advertisers may set a period of time during which to run the campaign, may set a number of impressions to hit before ending the campaign, or both. However, campaigns based on these methods may be too costly or short-lived. These methods also fail to account for whether the audience of a campaign responded to the campaign (e.g., reacted to the advertisement).

To address this, the following system additionally determines when to end an advertisement campaign. The system analyzes the number of impressions that have been provided. In some embodiments, the system analyzes the number of impressions that have been generated. The system also takes into account the number of impressions that remain in the campaign. The system then determines whether the campaign has influenced the decision of a user to consume the product being advertised. For example, if the impression is a social media post on Avengers Infinity War (e.g., an image on Instagram), the system will determine how many users clicked the impression or ended up buying movie tickets within a threshold period of time after seeing the impression. For example, if 70% of the generated impressions were effective in influencing users, the system will determine that the advertisement campaign is effective and should continue running. However, if only 10% of the generated impressions were effective, the system will determine that the advertisement campaign is ineffective, and users are uninterested. Rather than continuing to spend money on the campaign (specifically in terms of buying impressions), the system will automatically end the campaign.

Advertisers often run several advertisement campaigns simultaneously. For example, NBC may have separate campaigns for its shows: Saturday Night Live (SNL), America's Got Talent, American Ninja Warrior. When buying impressions for a campaign, the advertiser may select a show that it wants to push and may allocate a larger number of impressions for the show relative to the other shows. However, during the campaign, several factors can influence whether an impression is generated for a user. For example, a large number of impressions for SNL may be provided in a short period of time (e.g., 99% of what was initially allocated) and a much lower number of impressions of America Ninja Warrior may be provided (e.g., 10% of what was initially allocated) during the same span of time. As impressions are costly, in this scenario, the advertiser loses money on 90% of impressions allocated for America Ninja Warrior and under-budgets SNL impressions.

To address this, the system of the present disclosure reallocates impressions in a portfolio of the advertiser. For example, suppose the advertiser (e.g., NBC) has a portfolio of 3 shows: SNL, America's Got Talent, American Ninja Warrior. The advertiser purchases 100 impressions and launches a campaign for each show. While monitoring the generation of the impressions, the system may determine that 95, 12, and 55 impressions have been generated to viewers within a week of the campaigns for SNL, America's Got Talent, American Ninja Warrior, respectively. In response to determining that the impressions for America's Got Talent have been underutilized, the system will reallocate a certain number of impressions from American's Got Talent to SNL. The number of impressions to reallocate can be determined using any suitable technique.

In some embodiments, the system determines rates (e.g., number of presentations in a given period of time) at which impressions are generated for SNL and America's Got Talent, respectively. The system may then determine the ratio of the rates and transfer the ratio's worth of remaining impressions from America's Got Talent.

In some embodiments, the system determines the rates at which impressions are generated for all three shows. The system balances all rates by swapping where impressions are placed (e.g., the SNL impressions are popular because they are shown on a specific mobile application, whereas the America's Got Talent impressions are shown on an unpopular application—so the system has the impressions swap applications).

In some embodiments, the system alters impressions that are popular to also include content from the unpopular impressions (e.g., if people like clicking on the impression for SNL, include the America's Got Talent logo on the impression to improve exposure for both programs).

As referred to herein, the terms "media asset" and "content" should be understood to mean an electronically generated user asset, such as television programming, as well as pay-per-view programs, on-demand programs (as in video-on-demand (VOD) systems), Internet content (e.g., streaming content, downloadable content, Webcasts, etc.), video clips, audio, content information, pictures, rotating images, documents, playlists, websites, articles, books, electronic books, blogs, chat sessions, social media, applications, games, and/or any other media or multimedia and/or combination of the same.

FIG. 1 shows a generalized embodiment of illustrative equipment device 100. More specific implementations of user equipment devices are discussed below in connection with FIG. 2. Device 100 may receive content and data via input/output (hereinafter "I/O") path 102. I/O path 102 may provide content (e.g., broadcast programming, on-demand programming, Internet content, content available over a local area network (LAN) or wide area network (WAN), and/or other content) and data to control circuitry 104, which includes processing circuitry 106 and storage 108. Control circuitry 104 may be used to send and receive commands, requests, and other suitable data using I/O path 102. I/O path 102 may connect control circuitry 104 (and specifically processing circuitry 106) to one or more communications paths (described below). I/O functions may be provided by one or more of these communications paths, but are shown as a single path in FIG. 1 to avoid overcomplicating the drawing.

Control circuitry 104 may be based on any suitable processing circuitry such as processing circuitry 106. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor).

In client-server based embodiments, control circuitry 104 may include communications circuitry suitable for communicating with a guidance application server or other networks or servers. The instructions for carrying out the above-mentioned functionality may be stored on the guidance application server. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths (which is described in more detail in connection with FIG. 2). In addition, communications circuitry may include circuitry that enables peer-to-peer communication of user equipment devices, or communication of user equipment devices in locations remote from each other (described in more detail below).

Memory may be an electronic storage device provided as storage 108 that is part of control circuitry 104. As referred to herein, the phrase "electronic storage device" or "storage device" should be understood to mean any device for storing electronic data, computer software, or firmware, such as random-access memory, read-only memory, hard drives, optical drives, solid state devices, quantum storage devices, gaming consoles, gaming media, or any other suitable fixed or removable storage devices, and/or any combination of the same. Storage 108 may be used to store various types of content described herein as well as media guidance data described above. Nonvolatile memory may also be used (e.g., to launch a boot-up routine and other instructions). Cloud-based storage, described in relation to FIG. 2, may be used to supplement storage 108 or instead of storage 108.

Data for use by a thick or thin client implemented on user equipment device 100 is retrieved on-demand by issuing requests to a server remote to the user equipment device 100. In one example of a client-server based guidance application, control circuitry 104 runs a web browser that interprets web pages provided by a remote server. For example, the remote server may store the instructions for the application in a storage device. The remote server may process the stored instructions using circuitry (e.g., control circuitry 104) and generate the displays discussed above and below.

Figure 2:
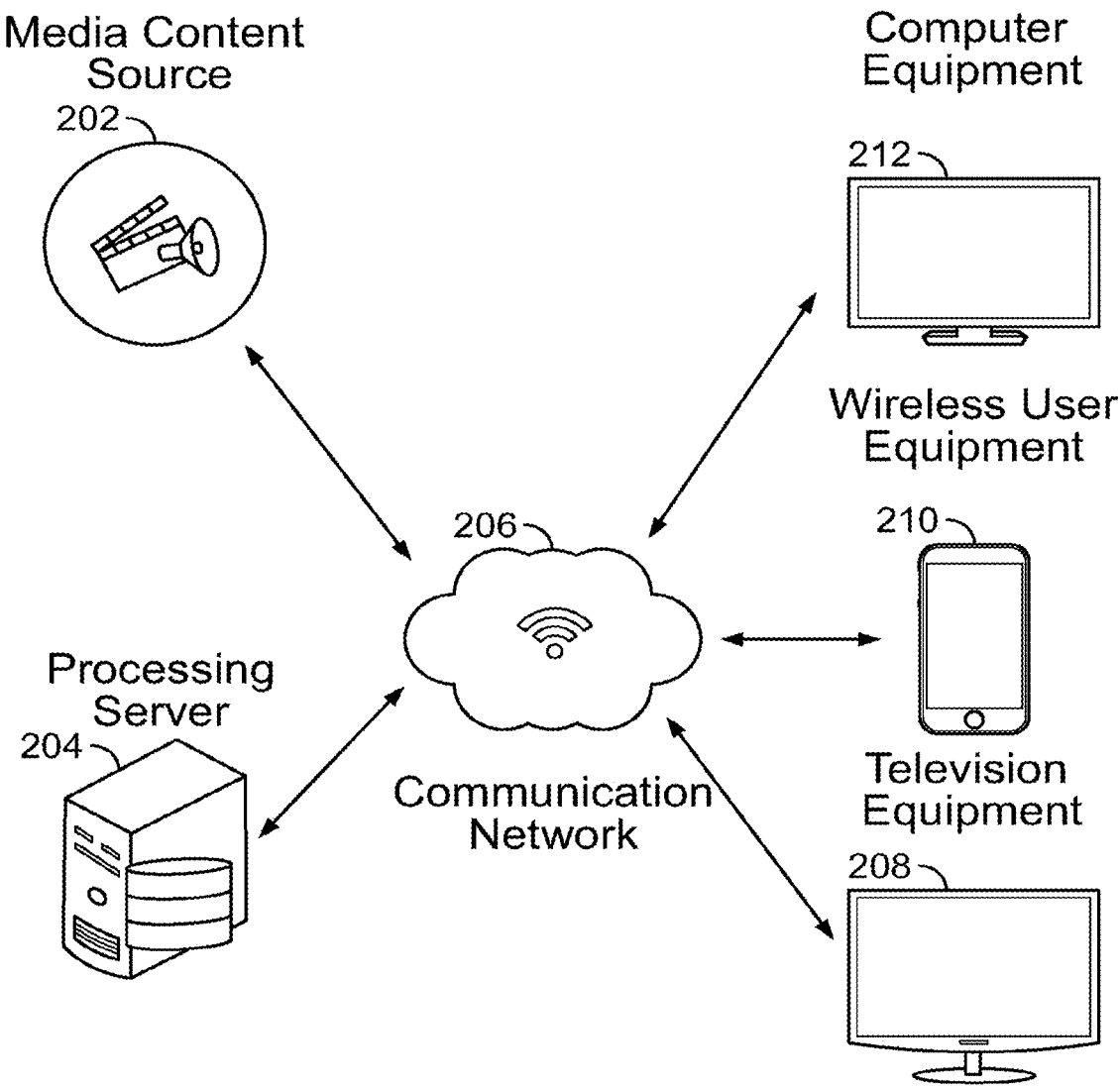
FIG. 2 is a block diagram of an illustrative media system in accordance with some embodiments of the disclosure.

User equipment device 100 of FIG. 1 can be implemented in system 200 of FIG. 2 as television equipment 208, computer equipment 212, wireless user equipment 210, or any other type of user equipment suitable for accessing content, such as a non-portable gaming machine. For simplicity, these devices may be referred to herein collectively as user equipment or user equipment devices, and may be substantially similar to user equipment devices described above.

In system 200, there is typically more than one of each type of user equipment device but only one of each is shown in FIG. 2 to avoid overcomplicating the drawing. In addition, each user may utilize more than one type of user equipment device and also more than one of each type of user equipment device.

The user equipment devices may be coupled to communication network 206. Communication network 206 may be one or more networks including the Internet, a mobile phone network, mobile voice or data network (e.g., a 4G or LTE network), cable network, public switched telephone network, or other types of communications network or combinations of communications networks. Paths (e.g., depicted as arrows connecting the respective devices to communication network 206) may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. Communications with the user equipment devices may be provided by one or more of these communications paths, but are shown as a single path in FIG. 2 to avoid overcomplicating the drawing.

Although communications paths are not drawn between user equipment devices, these devices may communicate directly with each other via communication paths as well as other short-range point-to-point communication paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. The user equipment devices may also communicate with each other directly through an indirect path via communication network 206.

System 200 includes media content source 202 and processing server 204. It should be noted that processing server 204 is described as user equipment device 100 in FIG. 1. Communications with the media content source 202 and processing server 204 may be exchanged over one or more communications paths, but are shown as a single path in FIG. 2 to avoid overcomplicating the drawing. In addition, there may be more than one of each of media content source 202 and processing server 204, but only one of each is shown in FIG. 2 to avoid overcomplicating the drawing. (The different types of each of these sources are discussed below.) If desired, media content source 202 and processing server 204 may be integrated as one source device.

Processing server 204 may retrieve guidance data from media content source 202, process the data as will be described in detail below, and forward the data to the user equipment devices 208, 210, 212. Media content source 202 may include one or more types of content distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc., ABC is a trademark owned by the American Broadcasting Company, Inc., and HBO is a trademark owned by the Home Box Office, Inc. Media content source 202 may be the originator of content (e.g., a television broadcaster, a Webcast provider, etc.) or may not be the originator of content (e.g., an on-demand content provider, an Internet provider of content of broadcast programs for downloading, etc.). Media content source 202 may include cable sources, satellite providers, on-demand providers, Internet providers, over-the-top content providers, or other providers of content. Media content source 202 may also include a remote media server used to store different types of content (including video content selected by a user), in a location remote from any of the user equipment devices. Systems and methods for remote storage of content, and providing remotely stored content to user equipment are discussed in greater detail in connection with Ellis et al., U.S. Pat. No. 7,761,892, issued Jul. 20, 2010, which is hereby incorporated by reference herein in its entirety.

Media content source 202 may also provide media guidance data, such as the media guidance data described above. Media guidance data may be provided to the user equipment devices using any suitable approach. In some embodiments, the guidance application may be a stand-alone interactive television program guide that receives program guide data via a data feed (e.g., a continuous feed or trickle feed). Program schedule data and other guidance data may be provided to the user equipment on a television channel sideband, using an in-band digital signal, using an out-of-band digital signal, or by any other suitable data transmission technique. Program schedule data and other media guidance data may be provided to user equipment on multiple analog or digital television channels.

User equipment devices may operate in a cloud computing environment to access cloud services. In a cloud computing environment, various types of computing services for content sharing, storage or distribution (e.g., video sharing sites or social networking sites) are provided by a collection of network-accessible computing and storage resources, referred to as "the cloud." For example, the cloud can include a collection of server computing devices, which may be located centrally or at distributed locations, that provide cloud-based services to various types of users and devices connected via a network such as the Internet via communication network 206. In such embodiments, user equipment devices may operate in a peer-to-peer manner without communicating with a central server.

Figure 3:
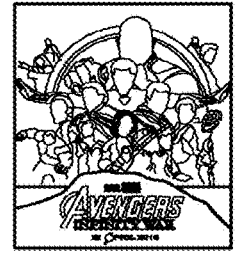
FIG. 3 shows an illustrative example of transferring an impression from a first media asset to a second media asset, in accordance with some embodiments of the disclosure.
Figure 3:
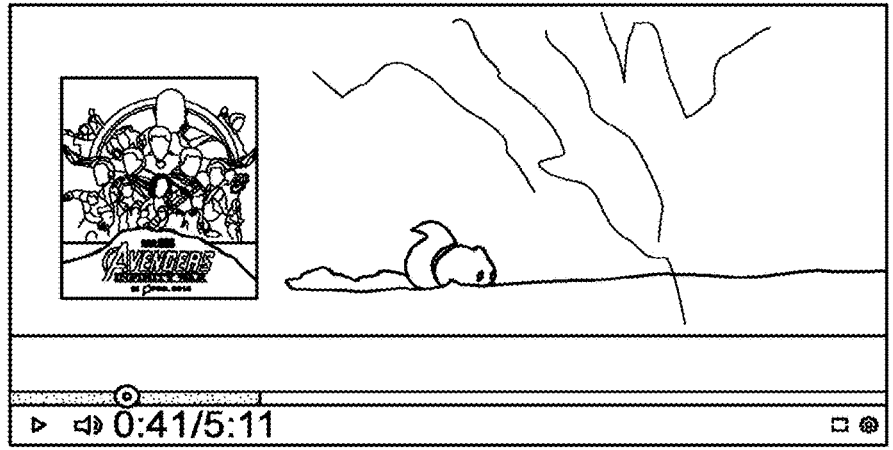
Figure 3:
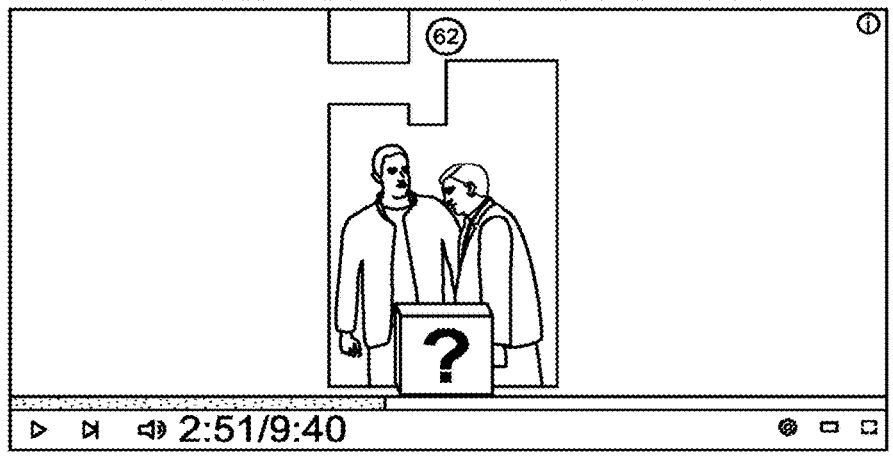
Figure 3:
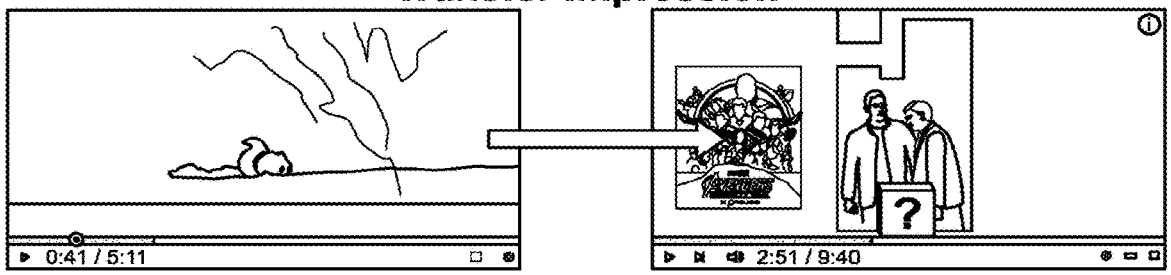

FIG. 3 shows an illustrative example of transferring an impression from a first media asset to a second media asset, in accordance with some embodiments of the disclosure. Impression 302 may be a generation of an advertisement. For example, the impression may be a commercial that has been presented to a user. In this application, impression 302 may be referred to as a potential impression (e.g., a commercial that is expected to be presented to a user). Therefore, when an impression is "transferred" to an alternate media asset, the system interprets the transfer as the expectation of an advertisement to be generated via the alternate media asset. More specifically, control circuitry 104 of processing server 204 may retrieve the advertisement associated with the impression from media content source 202.

Media asset 304 represents the current medium in which the advertisement associated with the impression is depicted. For example, media asset 304 is a YouTube video, and impression 302 is of a commercial that is to be played right before media asset 304. Media asset 306 represents an alternate medium (e.g., a different YouTube video) in which the impression can be potentially be transferred to. Control circuitry 104 retrieves media asset 304 and media asset 306 from media content source 202.

At 308, control circuitry 104 determines whether the impression should be transferred from media asset 304 to media asset 306. Control circuitry 104 intelligently distributes impressions during an advertisement campaign to optimize the viewer exposure range. Specifically, control circuitry 104 identifies content that a specific number of impressions are allocated for. Control circuitry 104 determines, for example, that 100 impression 302's are allocated to media asset 304. Simultaneously, control circuitry 104 monitors for other videos (e.g., media asset 306) where impressions can be transferred (given that the other video has a higher likelihood of being watched). Control circuitry 104 may determine that media asset 306 has gone viral (e.g., spike in views in a threshold period of time) based on information retrieved, over communication network 206, from user equipment devices 208, 210, 212 and media content source 202. Control circuitry 104 determines the number of impression 302's to transfer to the viral media asset 306 based on, for example, a likelihood ratio (likelihood of the viral media asset 306 being watched over likelihood of the original video being watched).

Control circuitry 104 may use additional factors to determine whether to redistribute impressions in an advertisement campaign. For example, control circuitry 104 may transfer impression 302's from media asset 304 to media asset 306 in response to determining that the current medium (e.g., video, game, application, website, etc.) is failing to attract viewers to which the impression 302 is presented. Likewise, control circuitry 104 may transfer additional impressions in response to determining that media asset 304 is attracting several viewers receive the impression 302. If the impressions are in broadcasts (e.g., commercials in television shows), control circuitry 104 may transfer the impression to a different show in the broadcast (e.g., may be moved around in a schedule) based on when users turn on their devices to view the broadcasts.

At 310, control circuitry 104 transfers the impression from media asset 304 to media asset 306. More specifically, control circuitry 104 transfers the advertisement associated with the impression to media asset 306. It should be noted that the transfer can be made at processing server 204, or a user equipment device (e.g., 208, 210, 212). For example, processing server 204 may receive media asset 306 from media content source 202 and insert the advertisement associated with impression 302 into media asset 306. The combination of media asset 306 and the advertisement arc then delivered to the user equipment device (e.g., 208, 210, 212). In some embodiments, media asset 306 may be transmitted to the user equipment device (e.g., 208, 210, 212) from media content source 202 and data indicating the transfer of the impression may also be transmitted to the user equipment device from processing server 204. Accordingly, the user equipment device may generate the combination of media asset 306 and the advertisement associated with the impression.

In certain scenarios, advertisers may set a period of time during which to run the campaign or may set a number of impressions to hit before ending the campaign. However, campaigns based on these methods may be too costly or short-lived. These methods also fail to account for whether the audience of a campaign responded to the campaign (e.g., consumed the product being advertised).

To address this, control circuitry 104 of processing server 204 additionally determines when to end an advertisement campaign. Control circuitry 104 analyzes the number of impressions that have been generated and the number of impressions that remain in the campaign, based on information received, over communication network 206, from user equipment devices 208, 210, 212 and media content source 202. Control circuitry 104 determines whether the campaign has influenced the decision of a user to obtain the product being advertised. For example, if the impression is a social media post on Avengers Infinity War (e.g., an image on Instagram), the system will determine how many users clicked the advertisement associated with the impression or ended up buying movie tickets within a threshold period of time after the impression was presented. Suppose that 70% of the generated impressions were effective in influencing users. Control circuitry 104 retrieves, from storage 108, a threshold percentage of generated impressions (e.g., 60%) that indicates that the campaign is effective. In response to determining that the percentage is greater than the threshold percentage, control circuitry 104 determines that the advertisement campaign is effective and should continue running. However, if only 10% of the generated impressions were effective despite a large number of impressions being generated, control circuitry 104 determines that the advertisement campaign is ineffective, and users are simply uninterested. Rather than continuing to spend money on the campaign (specifically in terms of buying impressions), control circuitry 104 will automatically end the campaign and inform media content source 202 via communication network 206.

Advertisers often run several advertisement campaigns simultaneously. For example, NBC may have separate campaigns for its shows: SNL, America's Got Talent, American Ninja Warrior. When buying impressions for a campaign, the advertiser may select a show that it wants to push and may allocate a larger number of impressions for the show relative to the other shows. However, during the campaign, several factors can influence how users receive impressions. For example, a large number of impressions for SNL may be generated in a short period of time (e.g., 99% of what was initially allocated) and a much lower number of impressions of America Ninja Warrior may be generated (e.g., 10% of what was initially allocated) during the same span of time. As impressions are costly, in this scenario, the advertiser loses money on 90% of impressions allocated for America Ninja Warrior and under-budgets SNL impressions.

To address this, control circuitry 104 of processing server 204 may reallocate impressions in a portfolio of the advertiser. Suppose that the advertiser (e.g., NBC) has a portfolio of 3 shows: SNL, America's Got Talent, American Ninja Warrior. The advertiser purchases 100 impressions and launches a campaign for each show. While monitoring the generation of the impressions, control circuitry 104 may determine that 95, 12, and 55 impressions have been generated by viewers within a week of the campaigns for SNL, America's Got Talent, and American Ninja Warrior, respectively. In response to determining that the impressions for America's Got Talent have been underutilized, control circuitry 104 will reallocate a certain number of impressions from American's Got Talent to SNL. The number of impressions to reallocate can be determined using different methods.

In some embodiments, control circuitry 104 determines rates (e.g., number of views in a given period of time) at which impressions are generated for SNL and America's Got Talent, respectively. The system may then determine the ratio of the rates and transfer the ratio's worth of remaining impressions from American's Got Talent.

In some embodiments, control circuitry 104 determines the rates at which impressions are generated for all three shows. The system balances all rates by swapping where impressions are placed (e.g., the SNL impressions are popular because they are shown on a specific mobile application, whereas the America's Got Talent impressions are shown on an unpopular application—so the system has the impressions swap).

In some embodiments, control circuitry 104 alters impressions that are popular to also include content from the unpopular impressions (e.g., if people like clicking on the impression for SNL, it includes the America's Got Talent logo on the impression to improve exposure for both programs).

It is contemplated that the steps or descriptions of each of FIG. 3 may be used with any other embodiment of this disclosure. In addition, the steps and descriptions described in relation to FIG. 3 may be done in alternative orders or in parallel to further the purposes of this disclosure. For example, each of these steps may be performed in any order or in parallel or substantially simultaneously to reduce lag or increase the speed of the system or method. Furthermore, it should be noted that any of the devices or equipment discussed in relation to FIGS. 1-2 could be used to perform one or more of the steps in FIG. 3.

While some portions of this disclosure may make reference to "convention," any such reference is merely for the purpose of providing context to the invention(s) of the instant disclosure, and does not form any admission as to what constitutes the state of the art.

For purposes of clarity and brevity, the following discussion is presented in terms of a system, such as some or all of system 200, providing certain functionality, performing certain steps, or both. It will be understood that reference to "the system" is made with respect to, for example, processing server 204, processing circuitry 106, control circuitry 104, any other suitable processing circuitry, or any combination thereof.

Figure 4:
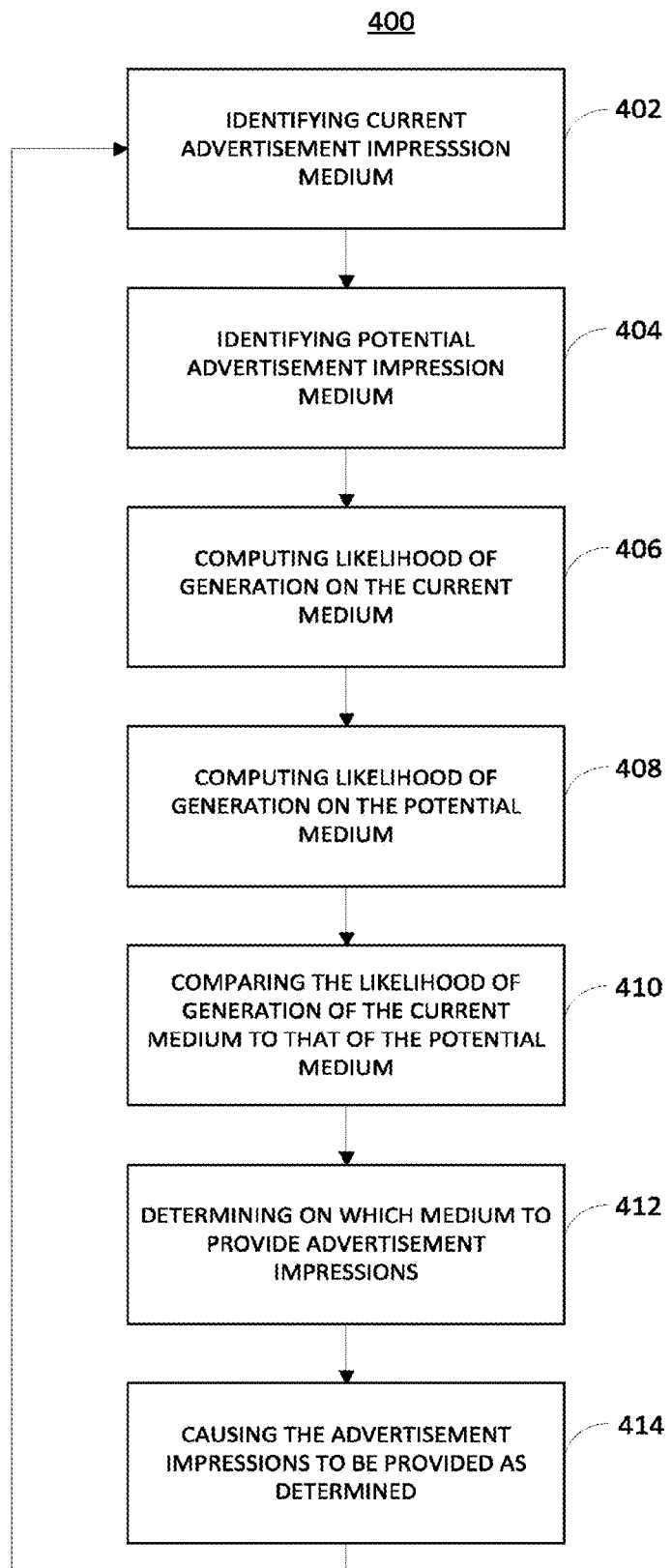
FIG. 4 shows a flowchart of illustrative steps for managing an advertisement campaign that involves reallocation of impressions between media in accordance with some embodiments of the present disclosure.

FIG. 4 shows a flowchart 400 of illustrative steps for managing an advertisement campaign that involves reallocation of impressions between media in accordance with some embodiments of the present disclosure. At step 402, the system identifies a medium currently being used for impressions of an advertisement campaign. For example, the system may access data stored in processing server 204, in any other suitable location, or any combination thereof that would indicate where and how impressions for an advertisement campaign managed by the system are being provided. As part of step 402, the system may identify one or more impression media in which impressions for a subject of the associated advertisement campaign are being provided.

At step 404, the system identifies at least one potential impression medium to which impressions of the current advertisement campaign can potentially be reallocated. For example, the system may keep track of available impression media on which impressions may be presented. The system may search through a database of these available impression media and identify one or more to which the impressions of the current advertisement campaign can potentially be reallocated. Identification may depend on any suitable factors including, for example, budgetary constraints, scheduling considerations, compliance considerations, subject matter of the advertisement campaign, nature of the impression, previous and/or concurrent advertisement campaigns, any other suitable factor, or any combination thereof.

At step 406, the system computes the likelihood of generating an impression for the advertisement on the current impression medium. This computation may be, for example, a number extrapolated from the number of generations the impression has received thus far or for a certain period of time while presented using the current impression medium. For example, if the impression has a generation rate of 20%, then the likelihood may be 0.20. Any other suitable representation of the likelihood can be used by the system, including a non-quantitative representation, such as "very unlikely", "not likely", "likely", and "very likely". In some embodiments, effectiveness of the impression on the current impression medium can be analyzed (e.g., via click-through rates, sales data, any other suitable effectiveness metric, or any combination thereof).

At step 408, the system computes a respective likelihood of generation for each of the one or more potential impression media identified at step 404. The likelihood of generation at step 408 is preferably of the same type as determined in step 406 for the current impression medium. The likelihood of generation for a potential impression medium may be computed based on any suitable criteria, such as, historical generation data for advertisements having certain similarities to the advertisement at issue in the current advertisement campaign. The historical generation data may be related to, for example, advertisements of the same subject matter genre as the current advertisements (e.g., an action movie, a television comedy, a mobile application, etc.). Historical generation data may be related to, for example, impressions generated on the potential medium by the same advertiser as the current advertisement campaign. It will be understood that the system may access any such suitable historical generation data, which might provide some indication of how likely generation of an impression would be for the potential impression medium.

In some embodiments, in determining the likelihood of generation for a particular potential impression medium, the system may calculate or otherwise access a popularity metric associated with the particular impression medium or associated with the subject of the advertisement campaign being presented on the particular impression medium. In one suitable approach, the popularity metric may be computed in any suitable way that reflects how often an impression is generated for subjects of the same genre as the subject of the current advertisement campaign (e.g., the generation rate of an impression for a media asset provided in a program guide application may be used in calculating a popularity metric for the program guide application when used to advertise a media asset).

In some embodiments, the likelihood computed at step 406 and the likelihood computed at step 408 may be based on a popularity metric that is based at least partially on real-time or prediction-based qualitative aspects associated with the current impression medium and with a potential impression medium. For example, the fact that a particular medium is expected to substantially rise in popularity may be used in computing likelihood of generation for that impression medium. To illustrate, a particular YouTube channel may be expected to rise in popularity and therefore provide a higher likelihood of generation based on, for example, the system's analysis of trend information for user views of videos on the particular YouTube channel. The system may access such real-time qualitative information. For example, the particular YouTube channel may have recently been featured in a popular article. This fact may be identified by the system using, for example, any suitable data mining and interpretation technique, by manual operator entry, by any other technique, or by any combination thereof. The system may also take into account the nature of the subject being advertised in determining the effect of the qualitative information.

Therefore, while the system may determine that historical quantitative indicators of a likelihood of generation for a particular impression medium are low, the system may rely instead on real-time or prediction-based indicators that indicate a higher likelihood of generation when such real-time or prediction-based indicators are determined to outweigh the historical quantitative indicators. In some embodiments, the system may consider both a popularity metric (based on quantitative information, qualitative information, or both) and historical information (based on quantitative information, qualitative information, or both) when determining likelihood of generation of an impression of interest on a particular impression medium.

At step 410, the system compares the likelihood of generation of the impression using the current medium to the impression using each of the one of more potential impression media.

At step 412, the system determines on which medium to provide the impressions for the advertisement campaign. This determination is based on the comparison at step 410. If the system determines that the likelihood of generation of the impression using the current impression medium is greater than the likelihood of generation of the impression using any of the one or more potential other impression media, then the system causes the impression to continue using the current impression medium at step 414. If, however, the system determines that another impression medium has a higher likelihood of generation for the impression, then the system will reallocate the impression to the other impression medium at step 414.

In some embodiments, the system may reallocate some, but not all, remaining impressions to one or more potential new impression media, while still leaving some budget of impressions for the initial impression medium when the likelihood of generation is greater on the potential new impression media, when the likelihood of generation for the potential new impression media is equal to or just slightly less than the original impression medium, or both.

In some embodiments, when the system reallocates the impressions amongst the current impression medium and other impression media, the system may maintain the overall current budget of impressions (i.e., the total number of impressions at any time does not change before and after the reallocation). In some embodiments, the system may determine to add or subtract from the total available impression budget based on any suitable criteria (e.g., when all available impression media have unimpressive likelihoods of generation, the overall budget may be lowered).

In some embodiments, when an advertisement campaign includes impressions of different media asset types (e.g., sound-based impressions, static image-based impressions, video-based impressions, etc.), the system may determine to use one or more particular media asset types of an impression for a particular impression medium. For example, if the system decides to reallocate a static image impression from a banner advertisement in a mobile application to a broadcast radio announcement, the system will replace the static image impression with a sound impression.

In some embodiments, process 400 may be repeated throughout an advertisement campaign. For example, the system may check to see if it makes sense to switch the impression medium for an impression based on a schedule, based on a threshold of user access events being met or not met, based on an operator command, based on any other suitable trigger, or any combination thereof.

Figure 5:
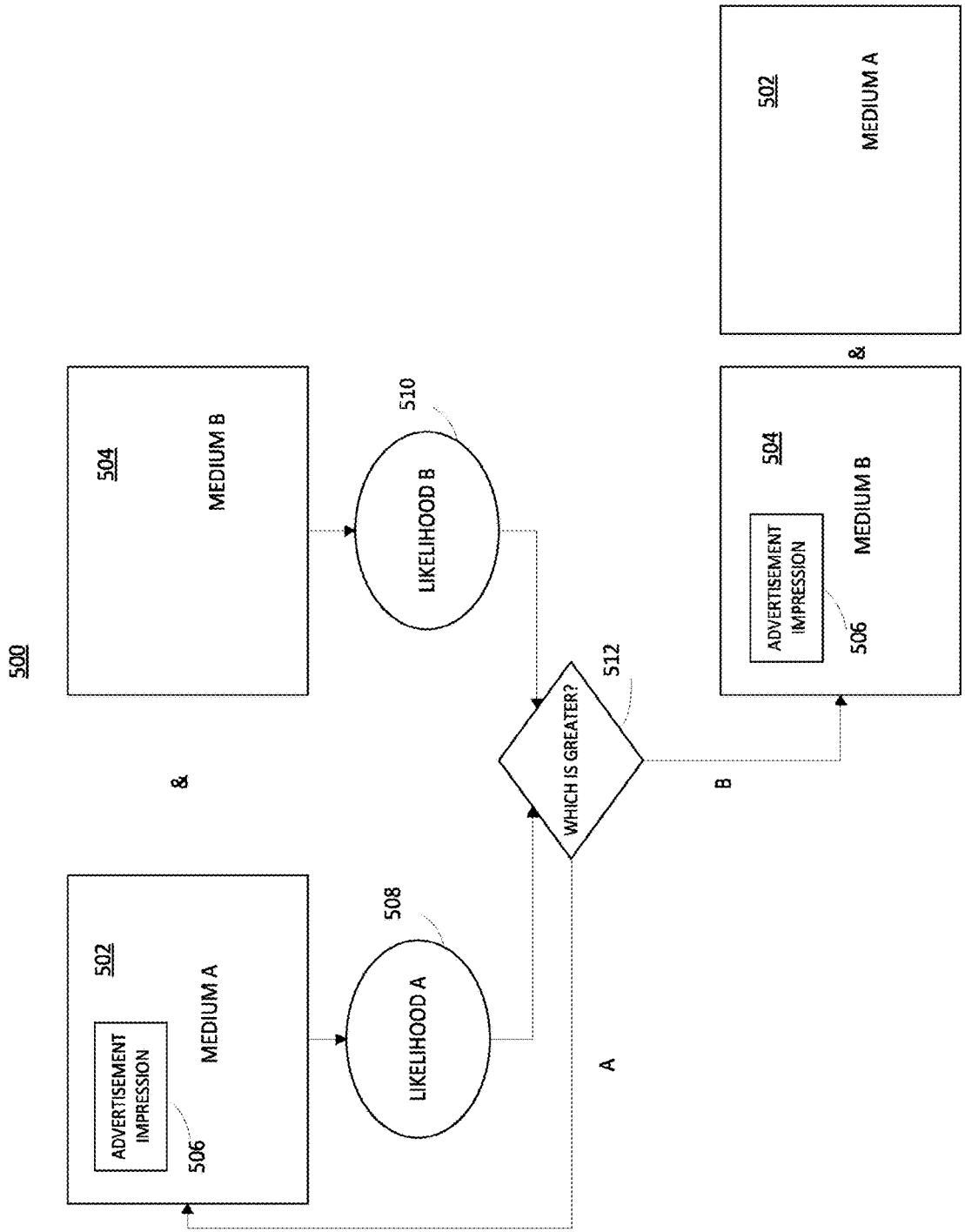
FIG. 5 illustrates a simplified process flow in which the system determines in which medium to provide an advertisement in accordance with some embodiments of the present disclosure.

FIG. 5 illustrates a simplified process flow 500 in which the system determines in which impression medium to provide an impression in accordance with some embodiments of the present disclosure. Medium A 502 is the initial impression medium in which advertisement 506 is provided. Medium B 504 is a potential impression medium, which the system will analyze to determine whether impression 506 should be moved to it. The system determines likelihood A 508 and likelihood B 510, representing the likelihood of generation of impression 506 in medium A 502 and medium B 504, respectively. The system uses any suitable technique for determining likelihood of generation, such as those described above with respect to steps 406 and 408 of FIG. 4. The system then determines which of likelihood A 508 and likelihood B 510 is greater at decision block 512.

If likelihood A 508 is greater, then the system causes impression 506 to remain in medium A 502. If likelihood B 510 is greater, then the system causes impression 506 to be moved to medium B 504. Therefore, the likelihood of generation of impression 506 is now greater than if impression 506 were kept in its original medium.

Parameters for an advertisement campaign may initially be defined according to relevant historical performance, forecasts based on information known at the time the advertisement campaign is being commenced, or both. As an advertisement campaign progresses, however, situations can change. Events may take place that affect the performance of the advertisement campaign in ways that were unforeseen at the time of commencement. Moreover, forecasts are by their nature merely estimates. Many times, forecasts are inaccurate. Historical performance, likewise, may not be indicative of future performance. Therefore, the system of the present disclosure reevaluates parameters of an advertisement campaign as the advertisement campaign progresses in order to determine updated forecasts of performance. Based on this reevaluation, the system may alter certain parameters of the advertisement campaign accordingly. For example, a budgeted number of impressions may be altered to be less or more than the initial budgeted amount according to the updated forecast.

Figure 6:
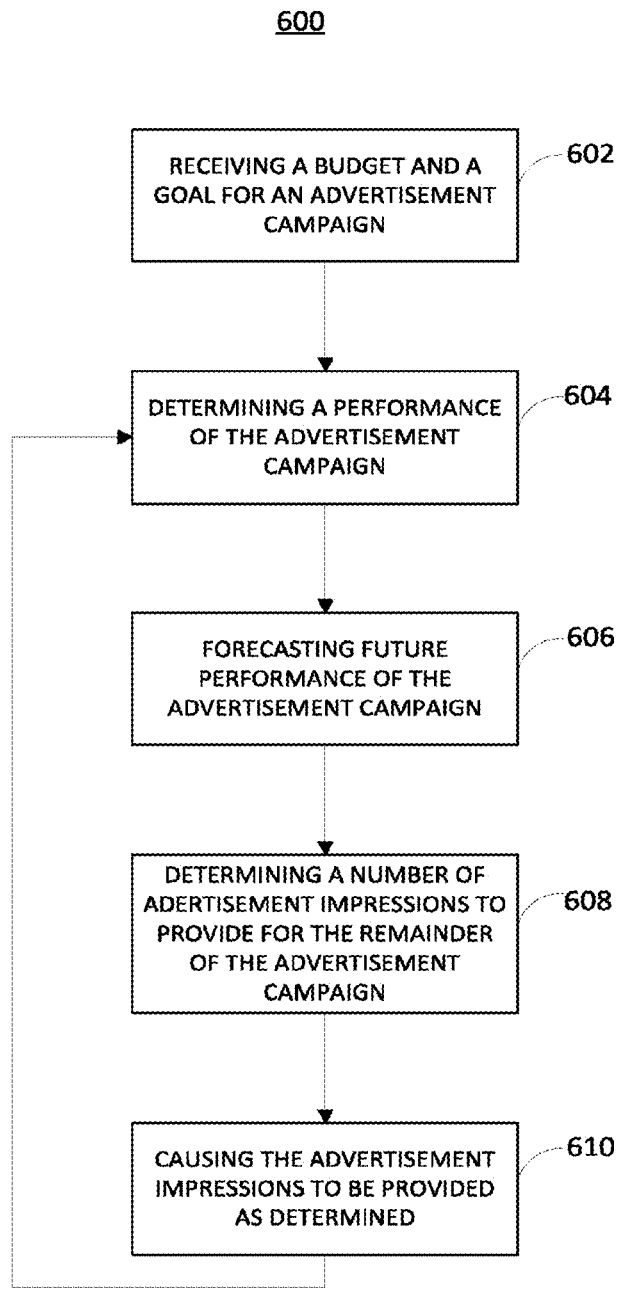
FIG. 6 shows a flowchart of illustrative steps for augmenting an impression budget of an advertisement campaign in accordance with some embodiments of the present disclosure.

FIG. 6 shows a flowchart 600 of illustrative steps for augmenting an impression budget of an advertisement campaign in accordance with some embodiments of the present disclosure. At step 602, the system receives an initial budget and a goal (i.e., target) for an advertisement campaign. The budget may be in terms of a number of impressions (e.g., presuming that each impression is fungible relative to any other impression, though not necessarily so), a monetary amount to be spent on providing impressions through the advertisement campaign, or both. The goal may be a desired performance of the advertisement campaign such as a minimum generation rate of impressions, increase in sales of the subject being advertised that is correlated to the advertisement campaign, any other suitable measurable target, or any combination thereof.

At step 604, the system determines a performance of the advertisement campaign. Step 604 can take place at a particular scheduled time, at a time relative to the commencement of the advertisement campaign, in response to the occurrence of an event (e.g., following the spending of a threshold amount of the budget), or any combination thereof. The system may measure performance using any suitable metrics. For example, performance may be measured based on a generation rate of impressions. More particularly, the system may determine the percentage of impressions that were clicked on, selected, or otherwise accessed by user to whom the impressions were presented. As another example, the system may calculate an average daily, hourly, weekly, etc., generation rate to use as a performance metric. In some embodiments, the system may determine an effectiveness rate for generated impressions as a measure of performance. For example, the system may determine whether generation of an impression led to a sale of the advertised product or service or through a click-through event. Any such suitable performance metric or metrics may be used by the system to determine the performance of an advertisement campaign at step 604.

At step 606, the system forecasts future performance of the advertisement campaign. For example, according to the performance determined at step 604, the system may extrapolate future performance. To illustrate, if the system determines a current performance according to a 20% generation rate to date, the system may extrapolate a forecast for future performance to remain at approximately the same 20% generation rate. The system may adjust the forecast using any suitable metrics or information available to it, including real-time qualitative information, such as those discussed above with respect to the computation of likelihoods in FIG. 4.

At step 608, the system determines a number of impressions to provide for the remainder of the advertisement campaign. For example, based on the forecast determined at step 606, the system determines an appropriate number of impressions that should be provided, given the goal of the advertisement campaign. For example, if the goal of the advertisement campaign was to achieve a 90% generation rate of impressions, and the system determines that the advertisement campaign is currently achieving a 5% generation rate, the system may determine to cancel the advertisement campaign because the goal is not likely to be reached and the advertisement campaign is therefore not effective. As another example, if the advertisement campaign is achieving a 95% generation rate, then the system may determine that a larger budget of impressions is worthwhile given the success of the advertisement campaign thus far, in which case the system will increase the budget and likewise adjust the goal to be more aggressive than the original 90%. The amount of increase of the budget and the goal may be determined by the system according to any suitable criteria, such as to keep it proportional with the current measured performance. If the system determines that the performance of the advertisement campaign is on par to meet the initially determined goal based on the initially determined budget, the system may determine not to make any adjustments.

At step 610, the system implements the adjustment to the number of impressions to be provided as determined at step 608.

It will be understood that, while flowchart 600 is discussed in terms of adjustment of the number of impressions, any other suitable adjustments to the advertisement campaign may be made in addition to or in place of an adjustment to the number of impressions. For example, a monetary budget may be adjusted, impression media on which the impressions are being provided may be modified, or any other suitable adjustments, or any combination thereof, may be made.

Figure 7:
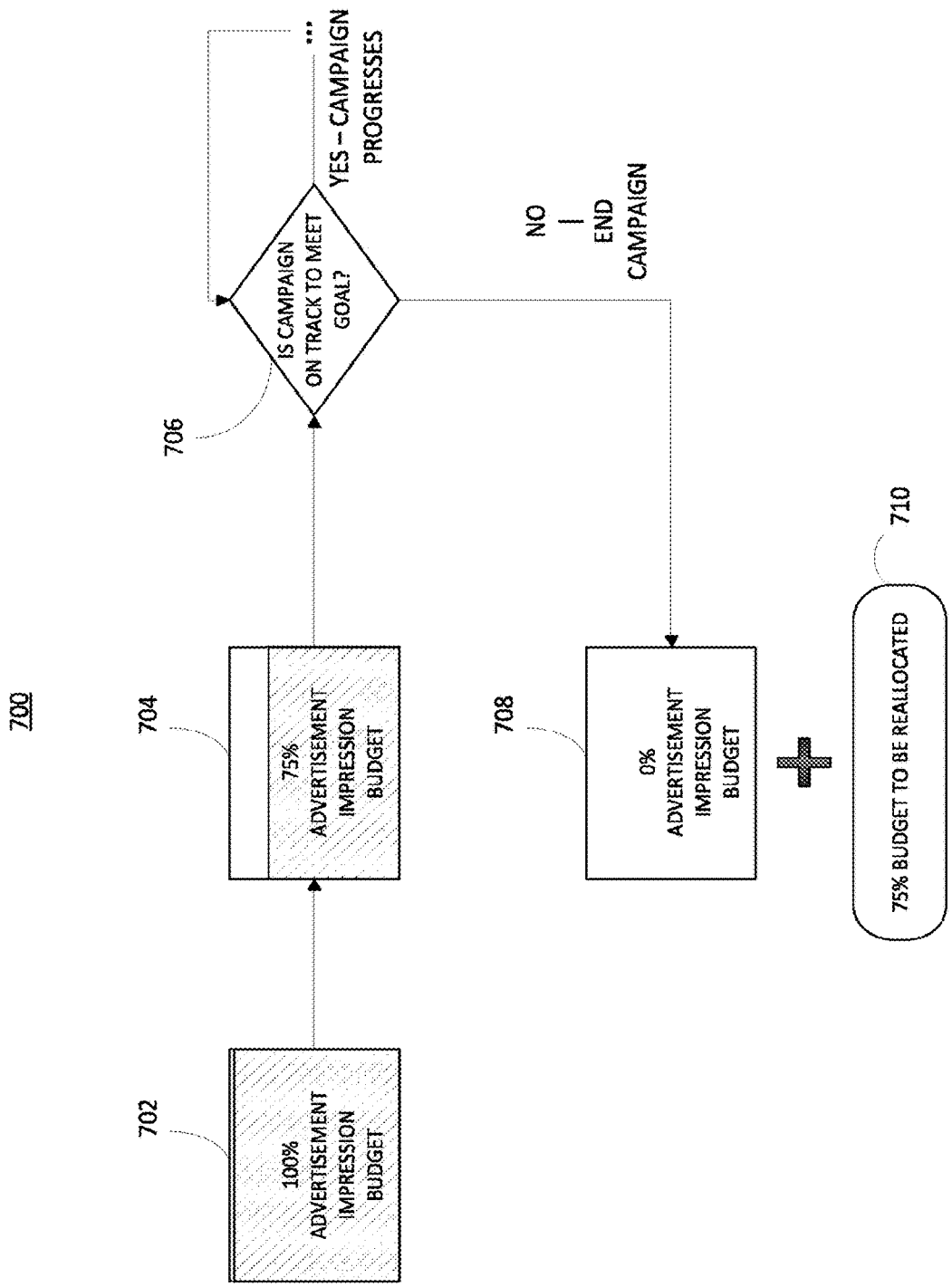
FIG. 7 illustrates a simplified process flow of an example in which the system determines whether to end an advertisement campaign in accordance with some embodiments of the present disclosure.

FIG. 7 illustrates a simplified process flow 700 of an example in which the system determines whether to end an advertisement campaign in accordance with some embodiments of the present disclosure. The system is provided with an impression budget 702 at the commencement of an advertisement campaign. As the advertisement campaign progresses, the budget is progressively depleted. At any suitable time, when the remaining budget 704 is at a particular level (i.e., at 75% of the original budget in the illustrated example), the system measures the performance of the advertisement campaign and determines at decision block 706 whether the advertisement campaign is on track to reach its initial goal. If the system determines that the advertisement campaign is on track to meet its goal, then the advertisement campaign is allowed to progress. The system may reevaluate the advertisement campaign any suitable number of times throughout the course of the advertisement campaign. If and when the system determines that the campaign is not on track to meet its goal, then the system in FIG. 7 decides to end the advertisement campaign at 708. As illustrated, the system decided to end the campaign when there is still 75% of remaining budget 710. The system may reallocate the remaining budget to another advertisement campaign or otherwise return it to the advertiser.

Figure 8:
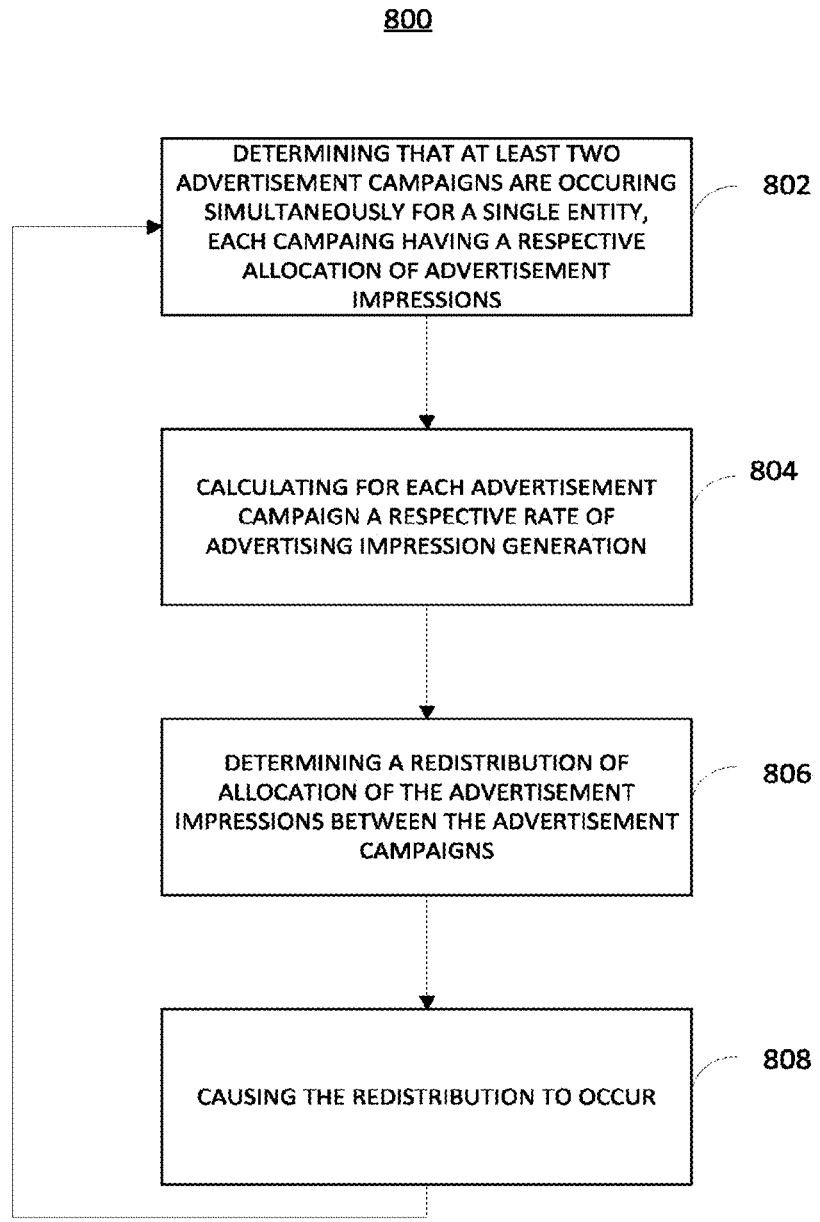
FIG. 8 is a flowchart of illustrative steps for redistributing impressions between simultaneously running advertisement campaigns in accordance with some embodiments of the present invention.

FIG. 8 is a flowchart 800 of illustrative steps for redistributing impressions between simultaneously running advertisement campaigns in accordance with some embodiments of the present invention. At step 802, the system determines that at least two advertisement campaigns are occurring simultaneously for a single advertiser entity, each campaign having a respective allocation of impressions. For example, a television network may be running two different advertisement campaigns for two respective television shows.

At step 804, the system calculates for each of the simultaneously occurring advertisement campaigns a respective rate of impression generation. In some embodiments, any other suitable performance metric may be calculated in addition to or in place of the generation rate as discussed, for example, above with respect to the performance metrics of FIG. 6 and the likelihoods of FIG. 4.

At step 806, the system determines a redistribution of allocation of the impressions between the simultaneously occurring advertisement campaigns. For example, the system may determine the redistribution based on the respective rates of impression generation (or any other suitable performance metric) calculated at step 804. The redistribution may be determined by the system according to any suitable formula or criteria. As an illustration, if the system determines that a first advertisement campaign has a generation rate of 10%, whereas a second advertisement campaign occurring simultaneously with the first has a generation rate of 80%, then the system may determine to redistribute a substantial portion of the first advertisement campaign's impression allocation to the second campaign. The amount of the redistribution may be based on, for example, maintaining at least a minimum allocation of impressions for any given campaign, on maintaining a particular minimum return on investment in any given campaign, on maintaining a maximum loss in any given campaign, on maintaining any suitable range of balance of allocations of impressions (or budgeted money) between active advertisement campaigns, or may be based on any other suitable constraints, requirements, or criteria, or any combination thereof. In some embodiments, the system may redistribute an entire allocation of impressions from one advertisement campaign to one or more other advertisement campaigns effectively terminating the first advertisement campaign.

In some embodiments, the system may determine, based, for example, on generation rate data, or on any other likelihood of generation information, to switch the medium being used by a first advertisement campaign to a different medium being used by a second advertisement campaign by the advertiser. For example, the system may determine that there exists more opportunity for generation using a particular impression medium based on measured performance of a currently active advertisement campaign that uses that particular impression medium. The system may determine that the subject of another advertisement campaign may be better advertised using the particular impression medium showing good performance in the simultaneously active advertisement campaign and may therefore move some or all impressions to that particular medium. In one suitable approach, attributes of the different impression media of the respective simultaneously occurring advertisement campaigns may be compared by the system in making the determination of whether and how to switch. For example, the system may determine that schedules associated with a certain impression medium are more effective for a particular advertisement campaign.

In some embodiments, the system may take into account certain advertisement strategies in making reallocation decisions (e.g., in terms of impression budgets, impression media to use, or both). For example, the system may be configured to make reallocations in accordance with a requirement to balance rates of generation between all or a particular subset of active advertisement campaigns, to give more attention to a particular subject of an advertisement campaign relative to subjects of other active advertisement campaigns or to otherwise prioritize subjects being advertised, any other suitable strategy, or any combination thereof.

At step 808, the system causes the determined redistribution of impressions to occur.

Figure 9:
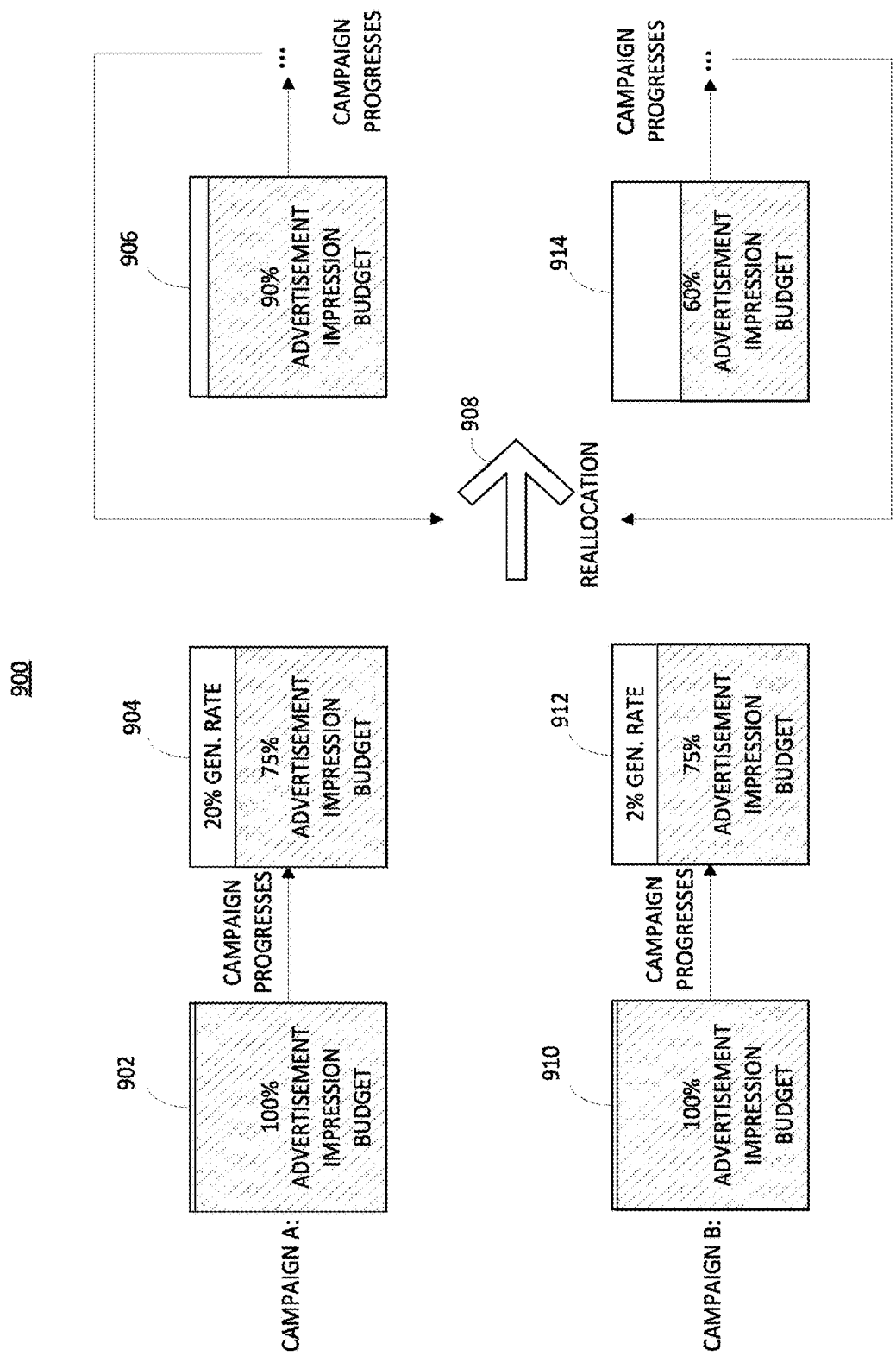
FIG. 9 illustrates a simplified process flow of an example in which the system determines a reallocation of an impression budget in accordance with some embodiments of the present disclosure.

FIG. 9 illustrates a simplified process flow 900 of an example in which the system determines a reallocation of an impression budget in accordance with some embodiments of the present disclosure. Campaign A and campaign B have initial impression budgets 902 and 910, respectively, which, for purposes of the illustrated example are equal, but need not be. As each campaign progresses, the respective budgets are being depleted. As shown, campaign A's budget and campaign B's budget are depleted until both are at 75% of their initial respective levels, at which point the system performs a reallocation 908 in accordance with some embodiments of the present disclosure, such as described with respect to FIG. 8. It will be understood that the illustrated example is merely exemplary, and that reallocation may occur at any suitable point in response to any suitable trigger. The fact that both budgets are at 75% in the illustrated example is also merely exemplary. The depletion need not be the same or proportional. At the point when the system performs reallocation 908, advertisement campaign A has an 80% generation rate, whereas advertisement campaign B has a 2% generation rate. The system recognizes that advertisement campaign A is more effective than campaign B and therefore reallocates 15% of the impression budget of campaign B to campaign A, yielding campaign A impression budget 906 having 90% of its initial budget. Campaign B impression budget 914, meanwhile, is reduced to 60% of its initial budget. As each advertisement campaign continues to progress, the system may perform one or more additional reallocations. Each time a reallocation is performed, the sum of the newly allocated impression budgets will be less than or equal to the previous allocation (not reflected in FIG. 9).

It will be understood that the features of the present disclosure, while described separately, may be used in any suitable combination with each other.

The foregoing is merely illustrative of the principles of this disclosure, and it will be understood by those skilled in the art that various modifications may be made without departing from the scope of this disclosure. The above-described embodiments are presented for purposes of illustration and not of limitation. The present disclosure also can take many forms other than those explicitly described herein. Accordingly, it is emphasized that this disclosure is not limited to the explicitly disclosed methods, systems, and apparatuses, but is intended to include variations to and modifications thereof, which are within the spirit of the following claims.

What is claimed is:

1. A method for managing impressions comprising:
   identifying a first platform and a second platform on which an advertisement is provided, wherein the advertisement has allocated a respective number of budgeted impressions;
   receiving, from the first platform via a network, a first real-time popularity of a subject of the advertisement on the first platform, a first anticipated spike of popularity of the first platform, and a first historical impression generation data indicative of other advertisements on the first platform that were similar to the advertisement;

receiving, from the second platform via the network, a second real-time popularity of the subject of the advertisement on the second platform, a second anticipated spike of popularity of the second platform, and a second historical impression generation data indicative of other advertisements on the second platform that were similar to the advertisement;

calculating, for the first platform, using processing circuitry, a first likelihood of impression generation for the advertisement based on the first real-time popularity, the first anticipated spike of popularity, and the first historical impression generation data;

calculating, for the second platform, using the processing circuitry, a second likelihood of impression generation for the advertisement based on the second real-time popularity, the second anticipated spike of popularity, and the second historical impression generation data;

comparing, using the processing circuitry, the first likelihood of impression generation and the second likelihood of impression generation;

determining, using the processing circuitry, a high-performing platform of the first platform and the second platform based on the first likelihood or the second likelihood being highest, and a low-performing platform of the first platform and the second platform based on the first likelihood or the second likelihood being lowest;

determining, using the processing circuitry, a redistribution of allocations of the number of budgeted impressions from the low-performing platform to the high-performing platform based on each of the first likelihood and the second likelihood; and causing to be implemented, using the processing circuitry, the redistribution of allocations from the low-performing platform to the high-performing platform.

2. The method of claim 1, further comprising:
identifying the other advertisements on the first platform and the other advertisements on the second platform that were similar to the advertisement based on a genre of the subject of the advertisement.

3. The method of claim 1, wherein an impression is of a first media asset type for the first platform and wherein the impression is of a second media asset type for the second platform.

4. The method of claim 1, wherein the first historical impression generation data comprises a history of the other advertisements on the first platform.

5. The method of claim 1, wherein the second historical impression generation data comprises a history of the other advertisements on the second platform.

6. The method of claim 1, wherein the comparing, using the processing circuitry, the first likelihood of impression generation and the second likelihood of impression generation further comprises:
determining whether the first likelihood of impression generation is greater than the second likelihood of impression generation.

7. The method of claim 6, wherein the determining whether the first likelihood of impression generation is greater than the second likelihood of impression generation comprises:
computing a likelihood ratio of the first likelihood of impression generation and the second likelihood of impression generation.

8. The method of claim 1, wherein the first anticipated spike of popularity of the first platform is determined based on future events that may increase impression generation on the first platform.

9. The method of claim 1, wherein the second anticipated spike of popularity of the second platform is determined based on future events that may increase impression generation on the second platform.

10. A system comprising:
memory;
processing circuitry configured to:
identify a first platform and a second platform on which an advertisement is provided, wherein the advertisement has allocated a respective number of budgeted impressions;
receive, from the first platform via a network, a first real-time popularity of a subject of the advertisement on the first platform, a first anticipated spike of popularity of the first platform, and a first historical impression generation data indicative of other advertisements on the first platform that were similar to the advertisement;
receive, from the second platform via the network, a second real-time popularity of the subject of the advertisement on the second platform, a second anticipated spike of popularity of the second platform, and a second historical impression generation data indicative of other advertisements on the second platform that were similar to the advertisement;
calculate, for the first platform a first likelihood of impression generation for the advertisement based on the first real-time popularity, the first anticipated spike of popularity, and the first historical impression generation data;
calculate, for the second platform a second likelihood of impression generation for the advertisement based on the second real-time popularity, the second anticipated spike of popularity, and the second historical impression generation data;
compare the first likelihood of impression generation and the second likelihood of impression generation;
determine a high-performing platform of the first platform and the second platform based on the first likelihood or the second likelihood being highest, and a low-performing platform of the first platform and the second platform based on the first likelihood or the second likelihood being lowest;
determine a redistribution of allocations of the number of budgeted impressions from the low-performing platform to the high-performing platform based on each of the first likelihood and the second likelihood; and
cause to be implemented the redistribution of allocations from the low-performing platform to the high-performing platform.

11. The system of claim 10, wherein the processing circuitry is further configured to:
identify the other advertisements on the first platform and the other advertisements on the second platform that were similar to the advertisement based on a genre of the subject of the advertisement.

12. The system of claim 10, wherein an impression is of a first media asset type for the first platform and wherein the impression is of a second media asset type for the second platform.

13. The system of claim 10, wherein the first historical impression generation data comprises a history of the other advertisements on the first platform.

14. The system of claim 10, wherein the second historical impression generation data comprises a history of the other advertisements on the second platform.

15. The system of claim 10, wherein the processing circuitry is further configured to compare the first likelihood of impression generation and the second likelihood of impression generation by:
   determining whether the first likelihood of impression generation is greater than the second likelihood of impression generation.

16. The system of claim 15, wherein the processing circuitry is further configured to determine whether the first likelihood of impression generation is greater than the second likelihood of impression generation by:
   computing a likelihood ratio of the first likelihood of impression generation and the second likelihood of impression generation.

17. The system of claim 10, wherein the first anticipated spike of popularity of the first platform is determined based on future events that may increase impression generation on the first platform.

18. The system of claim 10, wherein the second anticipated spike of popularity of the second platform is determined based on future events that may increase impression generation on the second platform.

* * * * *